US010730956B2

United States Patent
Bayer et al.

(10) Patent No.: US 10,730,956 B2
(45) Date of Patent: Aug. 4, 2020

(54) PROCESS FOR PRODUCING A WATER-SOLUBLE CELLULOSE DERIVATIVE HAVING A REDUCED CONTENT OF WATER-INSOLUBLE PARTICLES

(71) Applicant: Dow Global Technologies LLC, Midland, MI (US)

(72) Inventors: Roland Bayer, Walsrode (DE); Oliver Petermann, Hamburg (DE)

(73) Assignee: Dow Global Technologies LLC, Midland, MI (US)

( * ) Notice: Subject to any disclaimer, the term of this patent is extended or adjusted under 35 U.S.C. 154(b) by 74 days.

(21) Appl. No.: 15/541,642

(22) PCT Filed: Jan. 4, 2016

(86) PCT No.: PCT/US2016/012045
§ 371 (c)(1),
(2) Date: Jul. 5, 2017

(87) PCT Pub. No.: WO2016/111929
PCT Pub. Date: Jul. 14, 2016

(65) Prior Publication Data
US 2017/0355782 A1 Dec. 14, 2017

Related U.S. Application Data

(60) Provisional application No. 62/100,949, filed on Jan. 8, 2015.

(51) Int. Cl.
| C08B 11/20 | (2006.01) |
| C08B 11/193 | (2006.01) |
| C08B 13/00 | (2006.01) |

(52) U.S. Cl.
CPC ............ *C08B 11/20* (2013.01); *C08B 11/193* (2013.01); *C08B 13/00* (2013.01)

(58) Field of Classification Search
CPC ........ C08B 11/20; C08B 13/00; C08B 11/193
(Continued)

(56) References Cited

U.S. PATENT DOCUMENTS

| 2003/0236398 A1 | 12/2003 | Niinobe et al. | |
| 2014/0013999 A1* | 1/2014 | Goerlach-Doht | ....... C08B 11/20 |
| | | | 106/172.1 |

FOREIGN PATENT DOCUMENTS

| EP | 1375523 A1 | 1/2004 |
| JP | 1111770 A | 4/1989 |

(Continued)

OTHER PUBLICATIONS

Knarr et al., The shear dependence of the methylcellulose gelation phenomena in aqueous solution and in ceramic paste, Carbohydrate Polymers, 2014, pp. 80-88, vol. 111.

*Primary Examiner* — Shaojia A Jiang
*Assistant Examiner* — Everett White (57) ABSTRACT

A process for producing a water-soluble cellulose derivative of a reduced content of water-insoluble particles comprises the steps of a) reacting cellulose with an alkaline material to produce alkali cellulose, b) reacting the produced alkali cellulose with one or more derivatizing agents to produce a water-soluble cellulose derivative, c) washing the produced cellulose derivative with an aqueous liquid once or several times to provide a moist cellulose derivative having a water content of 25 to 85 percent, based on the total weight of the moist cellulose derivative, d) subjecting the moist cellulose derivative to homogenization to form the moist cellulose derivative to a paste, and e) pressing the paste through a filter of a pore size of up to 200 μm.

20 Claims, 2 Drawing Sheets

(58) Field of Classification Search
USPC .......................................................... 536/124
See application file for complete search history.

(56) References Cited

FOREIGN PATENT DOCUMENTS

| | | |
|---|---|---|
| WO | 2012051034 A1 | 4/2012 |
| WO | 2012138531 A1 | 10/2012 |
| WO | 2013119443 A1 | 8/2013 |

* cited by examiner

PROCESS FOR PRODUCING A WATER-SOLUBLE CELLULOSE DERIVATIVE HAVING A REDUCED CONTENT OF WATER-INSOLUBLE PARTICLES

FIELD

This invention relates to a process for producing a water-soluble cellulose derivative having a reduced content of water-insoluble particles.

INTRODUCTION

Water-soluble cellulose derivatives, such as water-soluble cellulose ethers, are obtained by treating cellulose having crystalline and amorphous moieties within the molecule with a derivatizing agent, such as an etherifying agent, for converting the crystalline moieties to an amorphous state whereby the cellulose derivative is made water soluble. It is acknowledged that the crystallinity of cellulose is largely ascribed to hydrogen bonds between hydroxyl groups within the molecule which develop on the skeleton structure of cellulose molecule. Cellulose is water insoluble because the hydrogen bonds are strong enough to prevent hydration with water molecules in water. In the preparation of cellulose derivatives, such as cellulose ethers, cellulose is treated with an alkaline aqueous solution such as NaOH to convert cellulose to alkali cellulose for disrupting crystallinity, and then reacted with a derivatizing agent, such as an etherifying agent, to substitute the derivatizing agent for hydroxyl groups on the cellulose to form a cellulose derivative. Ideally the cellulose derivative can be fully dissolved in water to form a transparent aqueous solution. However, since crystallinity has not completely disappeared in the alkali cellulose, commercially available water-soluble cellulose derivatives can partially contain water-insoluble particles, such as water-insoluble fibers, which are difficult and time-consuming to remove from the water-soluble cellulose derivative.

However, the residual content of water-insoluble particles is undesirable in many end-use applications. For example, water-soluble cellulose derivatives are used as a thickener for clear shampoo/rinses, hair conditioners, eye drops, contact lens cleaners, formulations for dipping solutions for capsule manufacture, formulations for clear tablet coatings, and the like. In these applications, products are desired to be clear. A substantial content of water-insoluble particles in water-based solutions of water-soluble cellulose derivatives will lead to deficient transparency.

Moreover, certain cellulose ethers, such as METHOCEL™ F4M cellulose ether and METHOCEL™ A4M cellulose ether, commercially available from The Dow Chemical Company, are used as binders/plasticizers in ceramic-forming materials, such as thin-walled honeycomb structures for use as a carrier for a catalyst or a catalyst filter for exhaust gas treatment. A substantial content of water-insoluble particles, such as water-insoluble fibers, in water-soluble cellulose ethers used as binders/plasticizers in thin-walled honeycomb structures lead to reduced stability and defects, such as pinholes, in the thin-walled honeycomb structures. Japanese Patent Application Publication JP1111770A suggests incorporating a cellulose derivative leaving ≤1,000 units of undissolved fibers having 8 to 200 μm diameter in 2 cm³ of its 0.1 wt. % aqueous solution as the molding binder for ceramic material. JP1111770A discloses that when using this cellulose derivative a molded product is obtained wherein pores are not formed after sintering.

US Patent Application No. 2003/0236398 discloses that aqueous solutions of cellulose ethers are filtered to remove those portions which have not been dissolved on the molecular level, prior to use. However, water-soluble cellulose ethers typically act as thickeners. Accordingly, aqueous solutions of cellulose ethers have a low concentration, typically only up to 10 weight percent, and frequently only up to 5 weight percent, based on the total weight of the aqueous solution. Therefore, producing aqueous solutions of cellulose ethers, filtering them and evaporating the water produces a large amount of waste water and requires much energy for the evaporation of the water. To solve the problem of water-insoluble fibers in water-soluble cellulose ethers US Patent Application No. 2003/0236398 suggests a method of selecting a water-soluble cellulose ether whose number of undissolved fibers having a size of 16 to 200 μm in a 0.1 wt.-% aqueous solution at 25° C. is up to 350 fibers/2 ml. An aqueous solution of such selected water-soluble cellulose ether is said to cause minimized clogging to a metal mesh having an opening of less than 63 μm. Unfortunately, US Patent Application No. 2003/0236398 only discloses how to select cellulose ethers for specific needs but does not teach how to reduce water-insoluble particles in a given water-soluble cellulose derivative. However, there is a strong and long-felt need not just to select cellulose ethers with a low level of undissolved particles but to find a process for producing a water-soluble cellulose derivative having a reduced content of water-insoluble particles.

WO2012/138531 discloses a process for reducing the amount of water-insoluble fibers in a water-soluble cellulose derivative. The process involves mixing a water-soluble cellulose derivative with water in a compounder to provide a moist water-soluble cellulose derivative having a temperature of at least 50° C. and a moisture content of from 35 to 90 percent, based on the total weight of the moist cellulose derivative; and drying-grinding the moist cellulose derivative in a gas-swept impact mill. The dried and ground cellulose derivative is preferably subjected to gas classification. Water-soluble cellulose derivatives of a reduced fiber are achieved; however the process is limited to a specific drying-grinding operation.

Accordingly, there is still the need to find another process for reducing the content of water-insoluble particles in water-soluble cellulose derivatives.

SUMMARY

Surprisingly, an effective method for producing a water-soluble cellulose derivative having a reduced content of water-insoluble particles has been found which can even be integrated into processes for producing cellulose derivatives and, accordingly, minimizes the work, time and energy required to reduce the content of water-insoluble particles, such as water-insoluble fibers, in the cellulose derivatives.

Accordingly, one aspect of the present invention is a process for producing a water-soluble cellulose derivative which process comprises the steps of a) reacting cellulose with an alkaline material to produce alkali cellulose, b) reacting the produced alkali cellulose with one or more derivatizing agents to produce a water-soluble cellulose derivative, c) washing the produced cellulose derivative once or several times to provide a moist cellulose derivative having a water content of 25 to 85 percent, based on the total weight of the moist cellulose derivative, d) subjecting the moist cellulose derivative to homogenization to form the moist cellulose derivative to a paste, and e) pressing the paste through a filter of a pore size of up to 200 µm.

It has surprisingly been found that a moist water-soluble cellulose derivative, such as a water-soluble cellulose ether, can be pressed through a filter, even when the filter has a pore size of only up to 200 µm, when the water-soluble cellulose derivative has a water content of 25 to 85 percent and when the moist cellulose derivative is homogenized to produce a paste. This finding is also useful for reducing the content of water-insoluble particles in water-soluble cellulose derivatives that have been produced and dried according to known procedures and for which the content of water-insoluble particles should subsequently be reduced.

Accordingly, another aspect of the present invention is a process for producing a water-soluble cellulose derivative having a reduced content of water-insoluble particles, which process comprises the steps of mixing a water-soluble cellulose derivative with an aqueous liquid at a weight ratio to provide a moist cellulose derivative having a water content of 25 to 85 percent, based on the total weight of the moist cellulose derivative, subjecting the moist cellulose derivative to homogenization to form the moist cellulose derivative to a paste, and pressing the paste through a filter of a pore size of up to 200 µm.

Yet another aspect of the present invention is a process for producing an esterified cellulose ether which comprises the steps of producing a water-soluble cellulose ether according to an above-described process and reacting the water-soluble cellulose ether with an aliphatic monocarboxylic acid anhydride or a di- or tricarboxylic acid anhydride or a combination of an aliphatic monocarboxylic acid anhydride and a di- or tricarboxylic acid anhydride.

Yet another aspect of the present invention is the use of a water-soluble cellulose derivative produced according to an above-described process in personal care, food or pharmaceutical compositions.

Yet another aspect of the present invention is the use of a water-soluble cellulose derivative produced according to an above-described process in electronic or optical compositions or in inorganic compositions having a honeycomb structure.

DESCRIPTION OF EMBODIMENTS

In one embodiment of the present invention a water-soluble cellulose derivative is produced in a process which comprises the steps of a) reacting cellulose with an alkaline material to produce alkali cellulose and b) reacting the produced alkali cellulose with one or more derivatizing agents.

Typically cellulose in finely divided state, such as cellulose pulp, is reacted in step a) with an aqueous alkaline solution, preferably an aqueous alkali metal hydroxide solution, more preferably an aqueous sodium hydroxide solution. The aqueous alkaline solution preferably has an alkali metal hydroxide content of from 30 to 70 percent, more preferably from 35 to 60 percent, based on the total weight of the aqueous alkaline solution. A known process is spray alkalization in a suitable mixing unit in which the ground cellulose is sprayed with an aqueous alkaline solution. Alternatively, ground cellulose is suspended in a suspension medium and an aqueous alkaline solution is then added. In a slurry alkalization process, the cellulose is suspended in aqueous alkaline solution and then passed through screw presses or sieve drum presses to remove excessive aqueous alkaline solution. Occasionally the treatment of the cellulose with an aqueous alkaline solution does not completely eliminate the crystallinity of the cellulose. While it would be desirable to transform cellulose completely to alkali cellulose, constraints in the production process can lead to residual amounts of non-reacted cellulose. The person skilled in the art knows what reaction conditions lead to increased amounts of non-reacted cellulose, such as the way of grinding of cellulose (pulp), which can result in undesired amounts of oversize particles which do not react, dead zones in a reactor, or an inhomogeneous distribution of sodium hydroxide during alkalization.

In step b) the produced alkali cellulose is reacted with one or more derivatizing agents to produce a water-soluble cellulose derivative. Derivatizing agents that have a desirable reactivity with alkali cellulose are known in the art. Preferred derivatizing agents are esterifying agents or etherifying agents, for example alkylating agents, such as methyl chloride, dimethyl sulfate or ethyl chloride; or hydroxyalkylating agents, such as ethylene oxide, propylene oxide and/or butylene oxide. Processes for producing cellulose ethers have been described in many publications, such as U.S. Pat. Nos. 4,477,657 and 3,839,319. An overview of the chemical fundamentals and principles of production (production processes and process steps) and a list of substances and description of the properties and potential uses of the various cellulose ethers is disclosed, for example, in Houben-Weyl, Methoden der Organischen Chemie, Makromolekulare Stoffe [Methods of Organic Chemistry, Macromolecular Substances], 4th edition, volume E 20, page 2042 (1987).

Preferred cellulose derivatives that are produced in step b) are cellulose esters or cellulose ethers. Preferred cellulose ethers are carboxy-$C_1$-$C_3$-alkyl celluloses, such as carboxymethyl celluloses; carboxy-$C_1$-$C_3$-alkyl hydroxy-$C_1$-$C_3$-alkyl celluloses, such as carboxymethyl hydroxyethyl celluloses; $C_1$-$C_3$-alkyl celluloses, such as methylcelluloses; $C_1$-$C_3$-alkyl hydroxy-$C_{1-3}$-alkyl celluloses, such as hydroxyethyl methylcelluloses, hydroxypropyl methylcelluloses or ethyl hydroxyethyl celluloses; hydroxy-$C_{1-3}$-alkyl celluloses, such as hydroxyethyl celluloses or hydroxypropyl celluloses; mixed hydroxy-$C_1$-$C_3$-alkyl celluloses, such as hydroxyethyl hydroxypropyl celluloses, or alkoxy hydroxyethyl hydroxypropyl celluloses, the alkoxy group being straight-chain or branched and containing 2 to 8 carbon atoms. The most preferred water-soluble cellulose derivatives are methylcelluloses, hydroxyethyl celluloses, hydroxypropyl celluloses, hydroxyethyl methylcelluloses or hydroxypropyl methylcelluloses.

The cellulose derivatives are water-soluble, which means that they generally have a solubility in water of at least 1 gram, more preferably at least 2 grams, most preferably at least 5 grams in 100 grams of distilled water at 25° C. and 1 atmosphere.

Most preferably, the water-soluble cellulose ether is a methylcellulose with a methyl degree of substitution $DS_{methyl}$ of from 1.2 to 2.2, preferably from 1.5 to 2.0; or a hydroxypropyl methylcellulose with a $DS_{ethyl}$ of from 0.9 to 2.2, preferably from 1.1 to 2.0, and a molar degree of substitution $MS_{hydroxypropyl}$ of from 0.02 to 2.0, preferably from 0.1 to 1.2, and more preferably from 0.1 to 0.4; or a hydroxyethyl methylcellulose with a $DS_{methyl}$ of from 1.15 to 2.3, preferably from 1.15 to 2.2, and a molar degree of substitution $MS_{hydroxyethyl}$ of from 0.03 to 1.0, preferably from 0.05 to 0.9; or a hydroxyethyl cellulose with an $MS_{hydroxyethyl}$ of from 1.2 to 3.0, preferably from 1.45 to 2.2. Most preferably the water-soluble cellulose ether is a methylcellulose with a methyl degree of substitution $DS_{methyl}$ of from 1.6 to 2.0 or a hydroxypropyl methylcellulose with a $DS_{methyl}$ of from 1.1 to 2.0 and a molar degree of substitution $MS_{hydroxypropyl}$ of from 0.1 to 0.4. The determination of the ether side groups, i.e. the $DS_{methyl}$, $MS_{hydroxyethyl}$ and $MS_{hydroxypropyl}$ can be effected as described by K. L. Ketterer, W. E. Kester, D. L. Wiederrich, and J. A. Grover, Determination of Alkoxyl Substitution in Cellulose Ethers by Zeisel-Gas Chromatographie, Analytical Chemistry, Vol. 51, No. 13, November 1979, 2172-76.

The viscosities of the water-soluble cellulose derivatives, such as water-soluble cellulose ethers, can vary over a broad range. In one aspect of the present invention the viscosity of the cellulose derivative is more than 200 mPa·s, preferably from 500 to 200,000 mPa·s, more preferably from 500 to 100,000 mPa·s, most preferably from 1000 to 80,000, particularly from 1000 to 60,000, determined in a 2.0% by weight aqueous solution at 20° C. in a Haake RS600 rheometer with a cone and plate Geometry (CP-60/2°) at 20° C. and at a shear rate of 2.55 s$^{-1}$.

In another aspect of the present invention the viscosity of the cellulose ether is from 1.2 to 200 mPa·s, preferably from 2 to 100 mPa·s, more preferably from 2.5 to 50 mPa·s, in particular from 3 to 30 mPa·s, measured as a 2 weight-% aqueous solution at 20° C. according to Ubbelohde. Ubbelohde viscosity measurements are conducted according to DIN 51562-1:1999-01 (January 1999). For example, a 2.0% by weight solution of hydroxypropyl methylcellulose in water is prepared according to United States Pharmacopeia (USP 35, "Hypromellose", pages 3467-3469), followed by an Ubbelohde viscosity measurement according to DIN 51562-1:1999-01 (January 1999). The viscosity of other water-soluble cellulose ethers can be measured analogously. Such low viscosity cellulose derivatives, such as cellulose ethers, can be produced in a known manner, e.g., by partial degradation of higher viscosity cellulose derivatives or by derivatization, such as etherification, of alkali cellulose in the presence of an oxidizing agent.

In the washing step c) the produced crude cellulose derivative is washed with an aqueous liquid once or several times to remove salt and other reaction by-products. The aqueous liquid may additionally comprise a minor amount of an organic liquid diluent. Preferred organic diluents are alcohols, more preferably multifunctional alcohols, such as glycerol, or monofunctional alcohols, such as methanol, ethanol, isopropanol or n-propanol; ethers, such as tetrahydrofuran, ketones, such as acetone, methyl ethyl ketone, or methyl isobutyl ketone; acetates, such as ethyl acetate; halogenated hydrocarbons, such as methylene chloride; or nitriles, such as acetonitrile. More preferably the organic liquid diluents have 1 to 6, most preferably 1 to 4 carbon atoms. However, the aqueous liquid should comprise at least 55, preferably at least 65, more preferably at least 75, most preferably at least 90, and particularly at least 95 weight percent of water, based on the total weight of the aqueous liquid. More preferably, water or brine is used as aqueous liquid. Most preferably the aqueous liquid is water.

Before or after washing, the cellulose derivative may be stripped by exposure to steam to reduce residual organic content. Cellulose derivatives, such as cellulose ethers, are generally washed at a temperature of at least 20° C., typically of at least 45° C., and more typically of at least 65° C. Typically a temperature of up to 120° C., preferably up to 95° C., is suitable for the washing step. The washing step typically includes separating the cellulose ether from the washing water, for example by sedimentation, centrifugation or filtration. The moist cellulose derivative is usually obtained in the shape of moist granules or moist lumps, e.g., in the shape of a water-moist filter cake.

The washing step c) of the process of the present invention is conducted in such a manner that a moist cellulose derivative is provided which has a water content of at least 25 percent, preferably at least 30 percent, more preferably at least 35 percent, most preferably at least 38 percent, and particularly at least 40 percent, based on the total weight of the moist cellulose derivative. The washing step c) is also conducted in such a manner that a moist cellulose derivative is provided which has a water content of up to 85 percent, preferably up to 80 percent, more preferably up to 70 percent, most preferably up to 60 percent, and particularly up to 50 percent, based on the total weight of the moist cellulose derivative. If the water content is higher, excess water is removed, for example by sedimentation, centrifugation or filtration. If the water content is lower, water is added to provide a moist cellulose derivative which has a water content in the above-mentioned range. The moist cellulose derivative is subsequently subjected to a homogenization step d) to form the moist cellulose derivative to a paste as described further below.

According to an alternative method, the washed, moist water-soluble cellulose derivative is not directly subjected to a homogenization step, but the washed, moist water-soluble cellulose derivative is subjected to a drying step and only then mixed with an aqueous liquid. A partial or complete drying of the washed water-soluble cellulose derivative prior to mixing it with an aqueous liquid may be useful, for example, if a non-aqueous washing liquor is used for washing the cellulose derivative or for constraints in the production process, e.g., when the washing step and the homogenization step are conducted at different locations. The washed cellulose ether can be dried in a known manner, e.g., using a contact dryer, such as a steam tube dryer, commercially available from Louisville Dryer Company (Louisville, USA) or a plate dryer, commercially available from Krauss-Maffei, Germany, to provide a water-soluble cellulose derivative that has a moisture content of less than 25 percent, typically less than 15 percent, and more typically 5 percent or less, based on the total weight of the moist cellulose derivative. Therefore, according to another embodiment of the present invention the process for producing a water-soluble cellulose derivative having a reduced content of water-insoluble particles comprises the step of mixing a water-soluble cellulose derivative with an aqueous liquid at a weight ratio to provide a moist cellulose derivative having a water content of 25 to 85 percent, based on the total weight of the moist cellulose derivative, and subjecting the moist cellulose derivative to homogenization to form the moist cellulose derivative to a paste. The amount of aqueous liquid to be mixed with the cellulose derivative depends on the water content, if any, of the partially or substantially dried cellulose derivative. Preferred water contents are as described above for the washing step c).

When subjecting the moist cellulose derivative to homogenization to form a paste, the moist cellulose derivative typically has a temperature of 0° C. or more, more typically of 2° C. or more, and most typically of 5° C. or more. Typically its temperature is up to 40° C., more typically of up to 30° C. and most typically of up to 20° C. The temperature of the moist cellulose derivative is preferably maintained within this temperature range during the homogenization step, for example by cooling the homogenization device if needed. For the homogenization step to form a paste a compounder is generally used that allows thorough and intense mixing and the formation of a paste. Useful compounders are, for example, kneaders, extruders, presses, or roller mills, wherein the mixture of the cellulose derivative and liquid is homogenised by applying shear forces and compounding, such as a twin-screw compounder. Kneaders are preferred homogenization devices. Co-rotating as well as counter-rotating machines are suitable. So-called divided trough kneaders with two horizontally arranged agitator blades that engage deeply with one another and that perform a mutual stripping action, as in the case of twin-screw compounders are particularly suitable. Suitable single-shaft, continuous kneaders include the so-called Reflector® compounders, which are high performance mixers of modular construction, consisting of a multi-part, heatable and coolable mixing cylinder and a unilaterally mounted blade mixer (manufacturer: Lipp, Germany) Also suitable are so-called pinned cylinder extruders or Stiftconvert® extruders (manufacturer: Berstorff, Germany) The pins incorporated in the housing serve as abutments in order to prevent the kneaded material rotating together with the shaft. Kneader mixers with so-called double-blade sigma stirrers (manufacturer: Fima, Germany) in a horizontal assembly are particularly suitable. The blades operate at different speeds and their direction of rotation can be reversed. A stirred vessel with a vertically arranged mixer shaft is also suitable if suitable flow baffles are mounted on the vessel wall in order to prevent the kneaded mass rotating together with the stirrer shaft, and in this way an intensive mixing action is imparted to the kneaded material (manufacturer: Bayer AG). Also suitable are double-walled mixing vessels with a planetary stirrer and inline homogenizer.

After homogenization the paste is preferably pressed through the filter by means of a suitable device such as an extruder. The extruder preferably allows cooling to keep the temperature of the paste in the above-mentioned range for homogenization. The paste typically has a temperature of 0° C. or more, more typically of 2° C. or more, and most typically of 5° C. or more and typically up to 40° C., more typically of up to 30° C. and most typically of up to 20° C. when it is pressed through the filter. The moist paste is pressed through a filter of a pore size of up to 200 μm, preferably up to 150 μm, more preferably up to 105 μm, even more preferably up to 85 μm, most preferably up to 65 μm and particularly up to 50 μm. Typically the filter has a pore size of at least 5 μm, more typically of at least 10 μm, and most typically of at least 15 μm. By the term "pore size" the geometric pore size is meant. The geometric pore size is described by the diameter of the largest spherical beads that can pass through the mesh or pores of the filter. The filter is preferably made of a metallic material, such as steel. The filter is preferably corrosion resistant. Most preferably the filter is made of stainless steel. Preferred filters are woven metallic filters. The woven metallic filters can be in the shape of a variety of weaves, such as a plain weave, twill weave, twill Dutch weave, reverse Dutch weave or a plain Dutch weave with one or two warp wires. The filter preferably has a thickness of at least 0.05 mm, more preferably at least 0.08 mm and most preferably at least 0.10 mm in the direction in which the paste is pressed through the filter. The filter thickness is preferably up to 5 mm, more preferably up to 2 mm, and most preferably up to 1 mm in the mentioned flow direction.

To increase the stability of the filter and minimize rupture of the filter, the filter is preferably supported by a support layer having openings that are larger than the pore size of the filter. The openings of the support layer are generally large enough that the support layer does not act as a second filter. More preferably, the support layer is a perforated metallic plate. The support layer preferably has circular openings of a diameter of at least 1 mm, more preferably at least 3 mm, and most preferably at least 5 mm, and preferably up to 100 mm, more preferably up to 40 mm, and most preferably up to 20 mm. The support layer preferably has a thickness of at least 10 mm and more preferably at least 15 mm in the direction in which the paste is pressed through the filter. The thickness of the support layer is preferably up to 100 mm and more preferably up to 50 mm in the mentioned flow direction.

After the step of pressing the paste through the filter according to the process of the present invention, the moist water-soluble cellulose derivative having a reduced content of water-insoluble particles can be subjected to drying or grinding or a combination thereof in one or more steps. Drying, grinding and combined drying-grinding processes are well known in the art.

As illustrated by the Examples below, generally a reduction in water-insoluble particles of at least 7 percent, typically at least 15 percent, more typically at least 30 percent, often even at least 50 percent and under optimal conditions even at least 70 percent can be achieved by the process of the present invention. The stated reduction is based on the weight of the water-insoluble particles in the water-soluble cellulose derivative prior to pressing the paste of moist water-soluble cellulose derivative through a filter according to the process of the present invention. The term "water-insoluble particles" as used herein means i) particles which have a solubility in water of less than 1 gram in 100 grams of distilled water at 25° C. and 1 atmosphere and/or ii) not fully dissolved particles of water-soluble cellulose derivatives, i.e., cellulose derivatives which are not dissolved on a molecular level but are still discrete, visibly detectable particles. Removed water-insoluble are, for example, non-reacted cellulose fibers or partially reacted water-insoluble cellulose derivatives or not fully dissolved particles of cellulose derivatives. Due to the low residual content of water-insoluble particles, clear aqueous solutions can be prepared from the water-soluble cellulose derivatives produced according to the process of the present invention. Accordingly, the water-soluble cellulose derivatives produced according to the process of the present invention are highly useful as thickeners in personal care, food or pharmaceutical compositions, particularly in fluid personal care compositions of high clarity or transparency, such as clear shampoo/rinses, hair conditioners, eye drops, contact lens cleaners, and the like or as adjuvants in health care applications, such as dipping solutions for capsule manufacture, or in formulations for clear tablet coatings, and the like. Preferred water-soluble cellulose derivatives in such personal care, food or pharmaceutical compositions are water-soluble cellulose ethers, more preferably methyl cellulose or hydroxypropyl methylcellulose which have been produced according to the process of the present invention and which have a viscosity of from 1.2 to 200 mPa·s, preferably from 2 to 100 mPa·s, more preferably from 2.5 to 50 mPa·s, in particular from 3 to 30 mPa·s, measured as a 2 weight-% aqueous solution at 20° C. according to Ubbelohde. Particularly preferred in such personal care, food or pharmaceutical compositions are cellulose ethers which have been produced as the commercially available material METHOCEL™ A15 Premium LV methylcellulose, METHOCEL™ E5 Premium LV hypromellose, METHOCEL™ E15 Premium hypromellose, or K3 Premium LV hypromellose and which have been subjected to the process of the present invention before subjecting them to a drying and grinding.

Alternatively, water-soluble cellulose derivatives produced according to the process of the present invention are useful in electronic or optical compositions or in inorganic compositions having a honeycomb structure. Water-soluble cellulose derivatives, preferably water-soluble cellulose ethers, more preferably methyl cellulose or hydroxypropyl methylcellulose which have been produced according to the process of the present invention and which have a viscosity of more than 200 mPa·s, preferably from 500 to 200,000 mPa·s, and more preferably from 1000 to 80,000, determined in a 2.0% by weight aqueous solution at 20° C. in a Haake RS600 rheometer with a cone and plate Geometry (CP-60/2°) at 20° C. and at a shear rate of 2.55 s$^{-1}$ are particularly useful as binders/plasticizers in ceramic-forming materials, such as thin-walled honeycomb structures, e.g., for use as a carrier for a catalyst or a catalyst filter for exhaust gas treatment. Thin-walled honeycomb structures of high stability and very few defects, such as pinholes, can be produced using such water-soluble cellulose derivatives as binders/plasticizers.

In a further embodiment water-soluble cellulose ethers produced according to the process of the present invention are useful in a reaction with an aliphatic monocarboxylic acid anhydride or a di- or tricarboxylic acid anhydride or a combination of an aliphatic monocarboxylic acid anhydride and a di- or tricarboxylic acid anhydride. Due to the reduced content of water-insoluble particles in the water-soluble cellulose ethers, the quality of the esterified cellulose ethers produced therefrom is also improved. More preferably, the cellulose ether is a hydroxypropyl methylcellulose. Most preferably hydroxypropyl methylcellulose acetate succinate (HPMCAS) is produced. The esterification of the cellulose ether can be conducted in a known manner, for example as described in U.S. Pat. Nos. 3,435,027 and 4,226,981, in the International Patent Applications WO 2005/115330, WO/2013/148154, WO/2014/031448, or WO/2013/148154 or in European Patent Application EP 0 219 426.

Some embodiments of the invention will now be described in detail in the following Examples.

EXAMPLES

Unless otherwise mentioned, all parts and percentages are by weight. In the Examples the following test procedures are used.

The content of visibly detectable water-insoluble particles (mainly non-reacted cellulose fibers or partially reacted water-insoluble cellulose derivatives, hereafter collectively designated as "fibers") in the mass of water-soluble cellulose derivative produced according to the process of the present invention is determined as ppm by weight of the water-soluble cellulose derivative. The content of water-insoluble particles was determined using a Liquid Analyzer LA-20 from OCS Optical Control Systems. The Liquid Analyzer LA-20 was calibrated with fiber standards consisting of dispersions of cellulose (wood pulp Rayonnier Cellunier F) in pure water with cellulose concentrations ranging from 258.06 mg/kg to 0.25 mg/kg. For analysis a solution of the water-soluble cellulose derivative in pure water (2 wt-% based on dry content) was used. For determination of the fiber content 1500 pictures within 5 min were recorded. The software automatically calculated the fiber content of the sample in mg/kg or μg/g equivalent to ppm (fiber content in ng per g dry cellulose derivative).

Example 1

Figure 1:
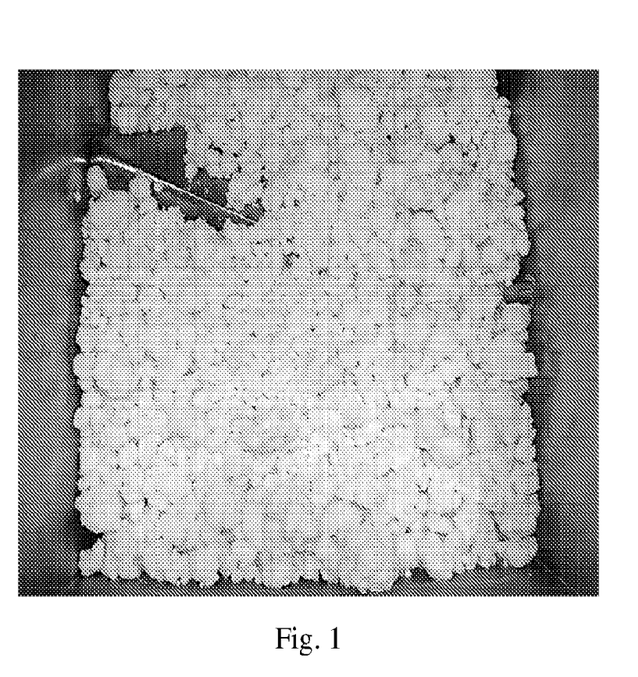
FIG. 1 illustrates a moist cellulose derivative having a water content of about 72 percent, based on the total weight of the moist cellulose derivative.
Figure 2:
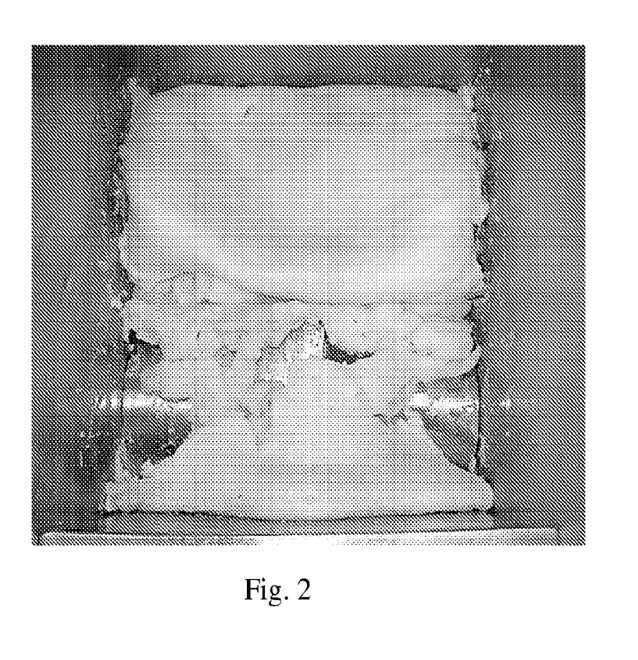
FIG. 2 illustrates a paste that has been produced by homogenization of the moist cellulose derivative illustrated in FIG. 1.

1.416 kg of a dry hydroxypropyl methylcellulose (HPMC) having a methyl degree of substitution $DS_{methyl}$ of 1.92, a molar degree of substitution $MS_{hydroxypropyl}$ of 0.24 and an Ubbelohde viscosity, measured as a 2 weight-% aqueous solution at 20° C. according to DIN 51562-1:1999-01 (January 1999), of 3.2 mPa·s were first filled in a 20 l fluidized-bed mixer, commercially available from Gebrüder Lödige Maschinenbau GmbH, Paderborn. Germany, as Lödige M 20 MK with an 1.5 kW engine. When the mixer was running at 230 rpm, 3.584 kg of ice-cooled water were subsequently sprayed into the batch of HPMC through a spraying nozzle. The spraying process took 5 min. Then the mixer was continuously allowed to run for further 20 sec. A moist cellulose HPMC resulted which formed a turbid, white mass containing dumpling-like particles of 0.5 to 2 cm diameter. FIG. 1 illustrates this mass of moist HPMC. This mass of moist HPMC was fed into a cooled kneader which was commercially available from the company Aachner Misch- and Knetmaschinenfabrik Peter Küpper GmbH & Co. KG, Germany (AMK) as AMK Type IIU Tilt-Kneader that had an engine of 2×1.5 kW, a usable volume of 20 l and a total volume of 35 l. The AMK Type IIU Tilt-Kneader was cooled down to −5° C. The mass was kneaded for five minutes. Subsequently the resulting paste was kept calm ("ripening" without kneading) for 45 minutes and was kneaded afterwards a second time for five minutes to homogenize the moist HPMC. The temperature of the resulting paste after this step was below 20° C. A quite homogeneous paste resulted from this kneading and homogenization step; dumpling-like particles of 0.5 to 2 cm diameter were no longer visible to a large degree. FIG. 2 illustrates the paste resulting from this kneading and homogenization step.

After kneading the paste was immediately introduced into a water-cooled, single-screw extruder which was commercially available from Handle GmbH, Mülhlacker as PZVE 8 D having an inner screw diameter of 80 mm, a feeder screw speed of 12 rpm and an auger screw speed of 15 rpm. The paste was pressed by extrusion through steel filters of defined pore sizes. The extrusion temperature was held constant and always below 30° C. with water cooling in the extruder jacket. Three different steel filters as listed in Table 1 below were used. A first portion of the paste was pressed through the first filter, a second portion of the paste was pressed through the second filter and a third portion of the paste was pressed through the third filter as listed in Table 1 below.

The first filter was a metal filter cloth with the designation Duplex 60 filter which had a geometric pore size of 82 μm. The metal filter cloth had a cloth thickness of 0.65 mm.

The second filter was a metal filter cloth with the designation Duplex 30 filter which had a geometric pore size of 37 μm. The metal filter cloth had a cloth thickness of 0.18 mm.

The third filter was a metal filter cloth with the designation Robusta 720×150 which had a geometric pore size of 17 μm. The metal filter cloth had a cloth thickness of 0.18 mm.

Figure 3:
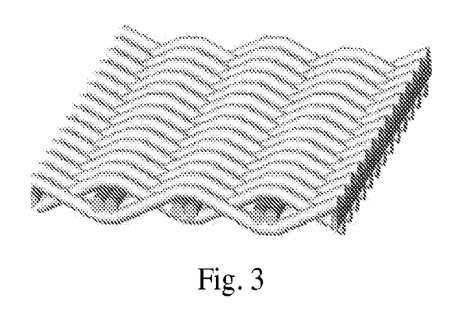
FIG. 3 illustrates a first filter type that is useful in the process of the present invention.
Figure 4:
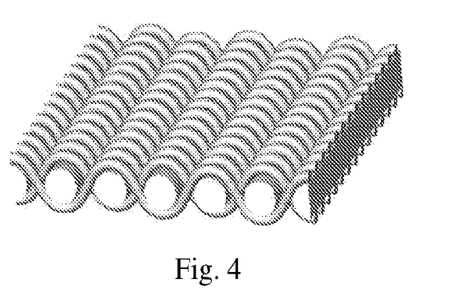
FIG. 4 illustrates a second filter type that is useful in the process of the present invention.
Figure 5:
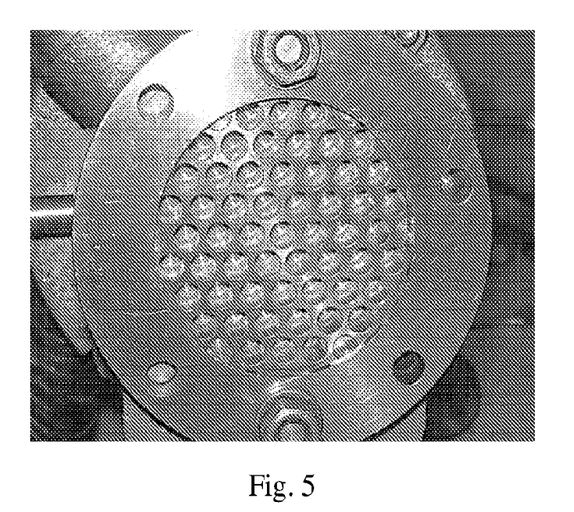
FIG. 5 illustrates a perforated metallic plate that supports the filter.

All three filters were commercially available from Spörl, Germany. FIG. 3 illustrates a metal filter cloth of the type Duplex. FIG. 4 illustrates a metal filter cloth of the type Robusta. Each of the filters were mounted on a filter support made of perforated steel. The filter support had a thickness of 17 mm and had circular openings of a diameter of 8 mm FIG. 5 illustrates the perforated metallic plate that supported each filter.

Before and after the HPMC paste was pressed through the filter, the content of the water-insoluble particles in the water-soluble HPMC was determined as described above.

Example 2

A HPMC having a methyl degree of substitution $DS_{methyl}$ of 1.79, a molar degree of substitution $MS_{hydroxypropyl}$ of 0.17 and an Ubbelohde viscosity, measured as a 2 weight-% aqueous solution at 20° C. according to DIN 51562-1:1999-01 (January 1999), of 45 mPa·s was produced in a known manner by reacting cellulose with alkaline sodium hydroxide to produce alkali cellulose and etherifying the produced alkali cellulose with methyl chloride and propylene oxide. The produced HPMC was washed with hot water and subjected to pressure filtration to produce a filter cake. The resulting HPMC filter cake had a water content of 40 percent, based on the total weight of the moist HPMC.

3.083 kg of the moist HPMC filter cake with a humidity of 40 percent was fed into the same cooled AMK Type IIU Tilt-Kneader as in Example 1, except that the kneader was cooled down to 12° C. During 30 sec. 1.917 kg of water was added leading to a HPMC of a water content of 63 percent, based on the total weight of the moist HPMC.

The mass was kneaded for further 14.5 minutes. Subsequently the resulting paste was kept calm ("ripening" without kneading) for 45 minutes and was kneaded afterwards a second time, this time for 10 minutes, to homogenize the moist HPMC. The resulting paste temperature after this step reached 24° C.

After kneading the paste was immediately introduced into the water-cooled, single-screw extruder PZVE 8 D as described in Example 1. Subsequently the paste was pressed by extrusion through steel filters of defined pore sizes as described in Example 1.

Example 3

A HPMC having a methyl degree of substitution $DS_{methyl}$, of 1.92, a molar degree of substitution $MS_{hydroxypropyl}$ of 0.26 and an Ubbelohde viscosity, measured as a 2 weight-% aqueous solution at 20° C. according to DIN 51562-1:1999-01 (January 1999), of 48 mPa·s was produced in a known manner by reacting cellulose with alkaline sodium hydroxide to produce alkali cellulose and etherifying the produced alkali cellulose with methyl chloride and propylene oxide. The produced HPMC was washed with hot water and subjected to pressure filtration to produce a filter cake. The resulting HPMC filter cake had a water content of 41 percent, based on the total weight of the moist HPMC.

3.56 kg of the moist HPMC filter cake with a humidity of 41 percent was fed into the same cooled AMK Type IIU Tilt-Kneader as in Example 1, except that the kneader was cooled down to 8° C. During 2 sec. 1.440 kg of water was added leading to a HPMC of a water content of 58 percent, based on the total weight of the moist HPMC.

The mass was kneaded for further 15 minutes. Subsequently the resulting paste was kept calm ("ripening" without kneading) for 45 minutes and was kneaded afterwards a second time for 15 minutes to homogenize the moist HPMC. The resulting paste temperature after this step reached 22° C.

After kneading the paste was immediately introduced into the water-cooled, single-screw extruder PZVE 8 D as described in Example 1. Subsequently the paste was pressed by extrusion through steel filters of defined pore sizes as described in Example 1.

TABLE 1

| Example | Fiber content before filtration (ppm) | Fiber content after filtration (ppm) through filter | | |
|---|---|---|---|---|
| | | Duplex 60 | Duplex 30 | Robusta 720 × 150 |
| 1 | 115 | 79 | 73 | 51 |
| 2 | 1253 | 1141 | 588 | Not assessed |
| 3 | 301 | 278 | 202 | 86 |

The Examples illustrate the effectiveness of the method of the present invention for producing water-soluble cellulose derivatives with a reduced content of water-insoluble particles.

The invention claimed is:

1. A process for producing a water-soluble cellulose ether or ester comprising the steps of
   a) reacting cellulose with an alkaline material to produce alkali cellulose,
   b) reacting the produced alkali cellulose with one or more etherifying or esterifying agents to produce a water-soluble cellulose ether or ester,
   c) washing the produced cellulose ether or ester with an aqueous liquid once or several times to provide a moist cellulose ether or ester having a water content of 25 to 85 percent, based on the total weight of the moist cellulose ether or ester,
   d) subjecting the moist cellulose ether or ester of step c) subsequently to homogenization to form the moist cellulose ether or ester to a paste,
   e) pressing the paste through a filter of a pore size of up to 200 μm and
   f) after step e) subjecting the cellulose ether or ester to drying and grinding.

2. The process of claim 1 wherein the paste is pressed through a filter of a pore size of up to 150 μm.

3. The process of claim 2 wherein the paste is pressed through a filter of a pore size of up to 85 μm.

4. The process of claim 1 wherein the water-soluble cellulose ether is a methylcellulose, hydroxyethyl cellulose, hydroxypropyl cellulose, hydroxyethyl methylcellulose or hydroxypropyl methylcellulose.

5. The process of claim 1 wherein the water-soluble cellulose ether or ester has a viscosity of from 1.2 to 200 mPa·s, measured as a 2 weight-% aqueous solution at 20° C. according to Ubbelohde.

6. The process of claim 1 wherein the aqueous liquid is water.

7. The process of claim 1 wherein homogenization is conducted in a kneader.

8. The process of claim 1 wherein the paste is pressed the through the filter at a temperature of from 0 to 40° C.

9. The process of claim 1 wherein the filter is a woven filter made of stainless steel.

10. A process for producing an esterified cellulose ether comprising the steps of producing a water-soluble cellulose ether according to the process of claim 1 and reacting the water-soluble cellulose ether with an aliphatic monocarboxylic acid anhydride or a di- or tricarboxylic acid anhydride or a combination of an aliphatic monocarboxylic acid anhydride and a di- or tricarboxylic acid anhydride.

11. A process for producing a water-soluble cellulose ether or ester having a reduced content of water-insoluble particles comprising the steps of mixing a water-soluble cellulose ether or ester with an aqueous liquid at a weight ratio to provide a moist cellulose ether or ester having a water content of 25 to 85 percent, based on the total weight of the moist cellulose ether or ester, subjecting the moist cellulose ether or ester to homogenization to form the moist cellulose ether or ester to a paste, pressing the paste through a filter of a pore size of up to 200 μm, and subjecting the water-soluble cellulose ether or ester having a reduced content of water-insoluble particles to drying and grinding.

12. The process of claim 11 wherein the paste is pressed through a filter of a pore size of up to 150 μm.

13. The process of claim 11 wherein the paste is pressed through a filter of a pore size of up to 85 μm.

14. The process of claim 11 wherein the water-soluble cellulose ether is a methylcellulose, hydroxyethyl cellulose, hydroxypropyl cellulose, hydroxyethyl methylcellulose or hydroxypropyl methylcellulose.

15. The process of claim 11 wherein the water-soluble cellulose ether or ester has a viscosity of from 1.2 to 200 mPa·s, measured as a 2 weight-% aqueous solution at 20° C. according to Ubbelohde.

16. The process of claim 11 wherein the aqueous liquid is water.

17. The process of claim 11 wherein homogenization is conducted in a kneader.

18. The process of claim 11 wherein the paste is pressed the through the filter at a temperature of from 0 to 40° C.

19. The process of claim 11 wherein the filter is a woven filter made of stainless steel.

20. A process for producing an esterified cellulose ether comprising the steps of producing a water-soluble cellulose ether according to the process of claim 11 and reacting the water-soluble cellulose ether with an aliphatic monocarboxylic acid anhydride or a di- or tricarboxylic acid anhydride or a combination of an aliphatic monocarboxylic acid anhydride and a di- or tricarboxylic acid anhydride.

* * * * *